United States Patent [19]
Pfeiffer

[11] Patent Number: 6,011,637
[45] Date of Patent: Jan. 4, 2000

[54] OPTICAL NETWORK UNIT AND CENTER OF AN OPTICAL COMMUNICATION NETWORK

[75] Inventor: Thomas Pfeiffer, Stuttgart, Germany

[73] Assignee: Alcatel, Paris, France

[21] Appl. No.: 08/855,377

[22] Filed: May 13, 1997

[51] Int. Cl.[7] .............................. H04J 13/00; H04J 14/00
[52] U.S. Cl. .......................... 359/120; 359/136; 370/479
[58] Field of Search ..................... 359/115, 120, 359/121, 135, 136, 137, 178; 370/441, 446, 479

[56] References Cited

U.S. PATENT DOCUMENTS

| | | | |
|---|---|---|---|
| 4,850,047 | 7/1989 | Iguchi et al. | |
| 5,414,699 | 5/1995 | Lee | |
| 5,619,492 | 4/1997 | Press et al. | 370/441 |
| 5,784,506 | 7/1998 | Pfeiffer | 385/24 |

FOREIGN PATENT DOCUMENTS

| | | |
|---|---|---|
| 0435467 | 7/1991 | European Pat. Off. |
| 0580016 | 1/1994 | European Pat. Off. |

OTHER PUBLICATIONS

Prucnal, P.R. "Ultra Fast Fiber–Optic Networks Using All–Optical Processing", Communications, 1988, ICC'88, Digital Technology–Spanning the Universe, pp. 1485–1489, Jul. 1988.

Onoda, T., et al., "A Novel Fiber–Optic Local Access System Adopting the 'Service–Uniform' ONU", IEEE, pp. 606–610, Feb. 1995.

Electronic Letters, Sep. 1, 1994, vol. 30, No. 18, pp. 1506–1507, "Optical LAN using distance multiplexing and reflection modulation" by Leich et al.

*Primary Examiner*—Melvin Marcelo
*Attorney, Agent, or Firm*—Ware, Fressola, Van Der Sluys & Adolphson LLP

[57] ABSTRACT

Optical communication networks (NET) transmit bidirectionally information between a center (OLT) and a plurality of optical network units (ONU) which are connected with each other by optical fiber links. The communication network (NET) of the invention operates with composite signals consisting of reference pulses and data packets which are transmitted in the time intervals between the reference pulses. The composite signals are transmitted to all optical network units (ONU). Each optical network unit (ONU) transmits its respective data stream to the center (OLT) using the asynchronous CDMA technique by modulating the received reference pulses with the respective data stream in an electro/optical unit (S1) and encoding the modulated reference pulses in a CDMA encoder (C1) using the CDMA technique.

11 Claims, 3 Drawing Sheets

OPTICAL NETWORK UNIT AND CENTER OF AN OPTICAL COMMUNICATION NETWORK

TECHNICAL FIELD

The invention relates to an optical network unit of an optical communication network.

BACKGROUND OF THE INVENTION

Optical communication networks require an optical transmitter in each optical network unit. To eliminate the need for the transmitters, an optical LAN in star topology with a central laser has been constructed, as described in Electronics Letters, Sep. 1, 1994, Vol. 30, No. 18, pages 1506–1507. The central laser provides reference pulses which are transmitted to all network units. In each network unit, the received reference pulses are modulated with the respective digital data stream via an electro/optical switch using the TDMA technique and subsequently reflected into the communication network. Because of the differences in propagation time which are caused, for example, by temperature variations, problems relating to synchronization can arise. The reflection of the modulated reference pulses is lossy and may lead to interferences with the unmodulated reference pulses. In addition, the optical network units have to be synchronized with respect to each other.

SUMMARY OF THE INVENTION

It is therefore an object of the invention to reduce the number of optical transmitters in optical network units. This object is solved by an optical network unit of an optical communication network for receiving composite signals consisting of periodically transmitted reference pulses and data packets transmitted in the time intervals between the reference pulses, comprising a processing unit for evaluating the received data packets and for generating a data stream, an electro-optical unit for modulating the received reference pulses with the generated data stream, and a CDMA encoder for encoding the modulated reference pulses using the asynchronous CDMA technique and for transmitting the encoded reference pulses.

Another object of the invention is a center of an optical communication network for transmitting composite signals consisting of reference pulses and data packets which are transmitted in the time intervals between the reference pulses, and for receiving a plurality of different CDMA-encoded signals, comprising a unit for generating the composite signals and a plurality of CDMA decoders for decoding the received encoded signals.

BRIEF DESCRIPTION OF THE DRAWINGS

In the following, the invention will be discussed in reference to an illustrative embodiment in conjunction with the accompanying drawings. In the drawings.

BEST MODE FOR CARRYING OUT THE INVENTION

Figure 1:
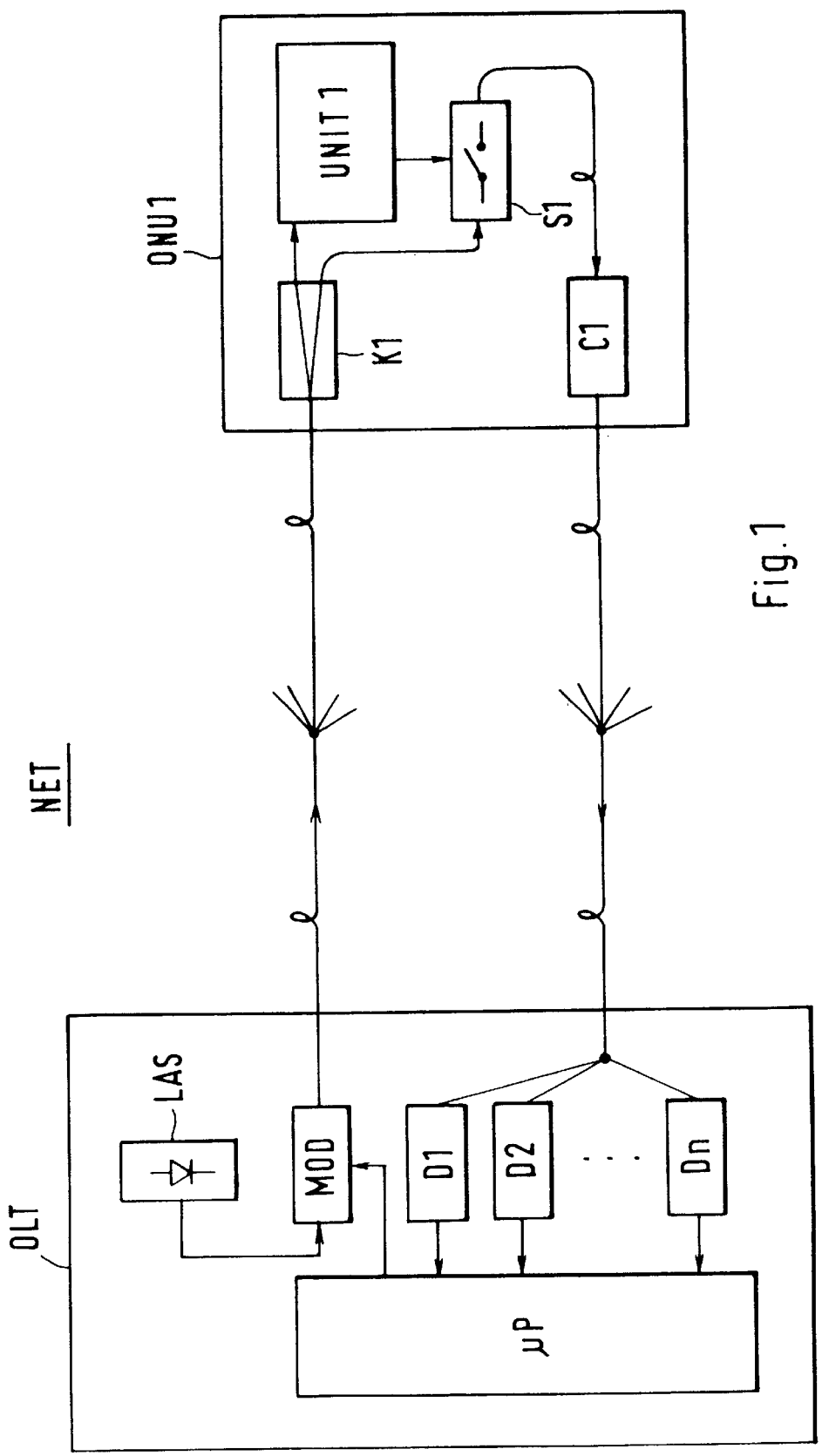
FIG. 1, a schematic illustration of a communication network of the invention.

The embodiment will now be initially described with reference to FIG. 1. FIG. 1 shows a communication network NET. The communication network NET is a bi-directional network. It comprises the center OLT which is connected via optical fiber links with several optical network units ONU, of which one unit is shown. For transmitting information from the center OLT to the network units ONU, the optical fiber links are implemented using optical splitters in star or tree topology. Independent of these optical fiber links, there exists additional optical fiber links which are also implemented in star or tree topology for the purpose of transmitting information from the optical network units ONU to the center OLT.

Information is transmitted from the center OLT to the optical network units ONU using the optical time division multiplex or TDM technique. For this purpose, there are data packets generated in the center OLT which are transmitted sequentially in time to all optical network units ONU via the glass fiber links. The beginning of each data packet contains an address specifying the network unit ONU for which the data packet is designated. Aside from the data packets, the center OLT also generates reference pulses. The reference pulses are transmitted periodically and serve two functions: first, the optical network units can use these reference pulses to establish synchronization with respect to the received information. Secondly, the optical network units ONU can use the received optical reference pulses to transmit information to the center OLT without having their own transmitter by modulating the optical reference pulses with their own data stream and transmitting these signals to the center OLT via the optical fiber links. As a result, the center OLT transmits composite signals comprising reference pulses and data packets. The data packets are transmitted during the time intervals between the reference pulses.

Information is transmitted from the optical network units ONU to the center OLT using the asynchronous CDMA technique; CDMA=Code Division Multiple Access. CDMA is an access technique wherein each optical network unit ONU is assigned a code. Each optical network unit ONU receives from the center OLT the composite signals comprising reference pulses and data packets. The data packets are evaluated if the addresses match. The received reference pulses are modulated with the data stream containing the information to be transmitted and are subsequently encoded using the CDMA technique before they are transmitted to the center OLT via the optical fiber links. Each optical network unit ONU uses its own individual code for encoding. The code is, for example, the address of the respective optical network unit ONU. In the center OLT, the reference pulses encoded with the CDMA technique are received, decoded and evaluated.

The communication between the center OLT and the optical network units ONU can be broadband. In this way, for example, an optical LAN can be constructed wherein the optical network units ONU communicate with each other, for example transmit data, via the center OLT.

The center OLT is a so-called Optical Line Termination. It comprises a light source LAS, an electro/optical modulator MOD, several CDMA decoders D1, D2, ..., Dn and an arithmetic unit $\mu P$. n is an integer number corresponding to the number of optical network units ONU adapted for bi-directional communication, wherein each of these units includes one CDMA encoder. The light source LAS comprises a laser diode for generating continuous (CW) light in the wavelength range 1520 nm to 1570 nm. The arithmetic unit $\mu P$ is implemented as a microprocessor. In the arithmetic unit $\mu P$, electrical signals are generated. The electrical signals are composite signals consisting of reference pulses and data packets. The reference pulses are transmitted periodically in order to enable the optical network units ONU to establish synchronization with respect to the reference pulses and to modulate and encode the reference pulses with their own data streams for transmission to the center OLT, so that the optical network units ONU can transmit information to the center OLT without requiring their own individual transmitter.

The output signals of the light source LAS are conveyed to the optical input of the electro/optical modulator MOD where they are modulated by the electrical signals applied to the electrical input of the electro/optical modulator MOD and subsequently transmitted to the optical network units ONU.

The data packets are designed to transmit information from the center OLT to the optical network units ONU. The transmitted data packets are received from all network units ONU. Consequently, they can contain information designated for all network units ONU, for example, cable TV signals, or information designated for individually selected network units ONU1, for example, video on demand signals or information designated for a selected group of network units ONU, for example, video conferencing signals.

The data packets are transmitted during the time intervals between the reference pulses.

The individual optical network units ONU use the asynchronous CDMA technique for accessing the optical fiber links for transmitting information from the optical network units ONU to the center OLT.

The CDMA decoders D1 to Dn are provided to decode in the center OLT the data streams which were encoded and transmitted by the network units ONU with the CDMA technique. Each CDMA decoder D1; D2; . . . ; Dn is associated with a CDMA encoder and thus with an optical network unit ONU1. The data stream transmitted from the optical network unit ONU1 is available in unencoded form at the output of the CDMA decoder D1. The data stream is transmitted in the same fashion as the output signals from the other CDMA decoders D1 to Dn to the arithmetic unit $\mu P$ where they undergo additional processing. A data stream comprises, for example, a request signal for a video movie whereafter the requested video movie is retrieved by the arithmetic unit $\mu P$ from a video movie storage device (not shown) and is transmitted, for example in real time, to the optical network units ONU via the electro/optical modulator in form of one or several data packets. The data packets are encoded so that only authorized optical network units ONU have access to the data packets.

In addition, two or more optical or network units ONU are also able to communicate with each other. In this case, the data streams received in the center OLT are transmitted to the optical network units ONU in conjunction with a designation of the optical network units ONU authorized to read the information.

The optical network unit ONU1 comprises an asymmetric coupler K1, a processing unit UNIT1, an electro/optical unit S1 and a CDMA encoder C1.

The asymmetric coupler K1 receives the composite signals transmitted by the center OLT. For example, 80% of the light intensity of the received composite signals is coupled out and conveyed to the electro/optical unit S1 and 20% of the light intensity is conveyed to the processing unit UNIT1.

The processing unit UNIT1 is provided for processing the received composite signals. It is checked, for example, if the data packet and the composite signals are designated for the optical network unit ONU1 or not. The optical network unit ONU1 has, for example, assigned to it an address which is transmitted at the beginning of each data packet designated for that address. The processing unit UNIT comprises a photodiode for optical/electrical conversion of the received composite signals and a comparator for comparing the header of the data packet with the address.

The processing unit UNIT1 is also provided for generating the data stream to be transmitted, for example the request signal for a video movie, and to convey the data stream to the electric input of the electro/optical unit S1. The generation takes place, for example, via a digital signal processor.

The processing unit UNIT1 further comprises a unit for extracting the reference pulses from the received composite signal. The extraction is accomplished, for example, by a phase-locked loop. The generated data stream is synchronized to the extracted reference pulses by a synchronizing unit so that the data stream modulates the composite signal in the electric optical unit S1 only when reference clock signals are present. The extracted reference pulses can be used, for example, for synchronizing the read clock of an intermediate memory used for the temporarily storing the generated data stream.

The electro/optical unit S1 is, for example, an electro/optical switch or an electro/optical modulator. The electro/optical unit S1 is consequently a unit with an optical input, an electrical input, and an optical output. Depending on the electrical input signals, the optical input signal is either transmitted to the output or not. The optical input signal consists of the received composite signal with the reference pulses and the data packets. The electrical input signal is the data stream to be transmitted. The data stream is always zero, i.e., the electro/optical switch is always open and the received composite signal is not transmitted unless logical ones are to be transmitted. For each logical one, the electro/optical switch is closed and a reference pulse is conveyed for each logical one to the CDMA encoder C1. Consequently, the electro/optical unit S1 modulates the received reference pulses with the data stream generated in the processing unit UNIT1.

The CDMA encoder C1 encodes optical signals using the CDMA technique. From each modulated reference pulse supplied to the CDMA encoder C1, a signal string characteristic for each optical network unit ONU is generated so that all signal strings can be detected even in the event that there is an overlap between several signal strings received simultaneously at the center OLT. An optical amplifier can be inserted between the electro/optical unit S1 and the CDMA encoder C1 for increasing the signal power of the selected signal strings.

As a result, the optical network unit ONU 1 does not require an optical transmitter for transmitting information, but uses instead the received reference pulses which it modulates, encodes and transmits to the center OLT. Because access to the optical fiber links by the optical network units ONU is asynchronous, information can be transmitted without time delay and without the need to synchronize the optical network units ONU with respect to each other.

Figure 2:
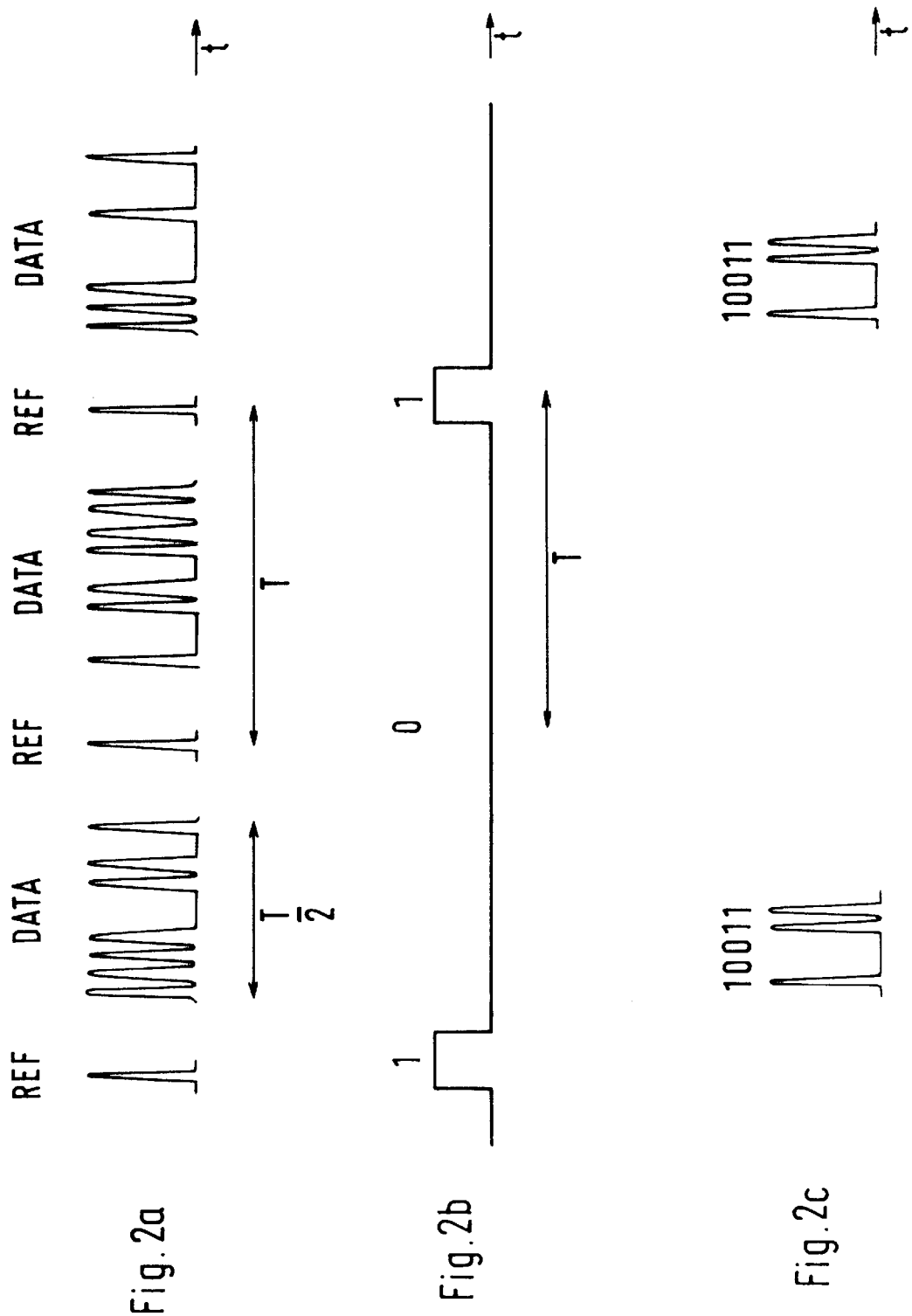
FIG. 2, illustrates three diagrams of signal forms.

The embodiment is now described further with reference to FIG. 2. FIG. 2 shows 3 diagrams of signal forms.

FIG. 2$a$ depicts a diagram of a signal form of a received composite signal. The composite signal contains reference pulses and data packets. Two consecutive reference pulses are separated by the time period T. Two consecutive data packets are also separated by the time period T. T is, for example, 6.4 ns. A data packet, for example, has the duration of T/2=3.2 ns.

FIG. 2b shows a diagram of the signal form of the data stream generated in the processing unit UNIT1. The data stream is a digital binary data stream comprising logical zeros and ones. Two consecutive signal values are separated by a time period T. T for example, has a value of 6.4 ns. This corresponds to a data rate of 155 Mbits/sec. The data stream always has the value zero unless logical ones are to be transmitted. At each logical one, the data stream has the value of one during a time period less than 3.2 ns. During each logical one, a reference clock signal is modulated in the electro/optical unit S1. Consequently, the reference pulses have to be synchronized with the data stream. This is attained, for example, by using the synchronizing unit and the intermediate memory, as described with reference to FIG. 1.

FIG. 2c shows a diagram of the signal form of a CDMA encoded reference pulse. At each logical one in the data stream, a sequence of signals characteristic for the respective optical network unit ONU is generated from the modulated reference pulse. In FIG. 2c, for example, the bit sequence is 10011. This corresponds to a 5-bit encoding. At the same time, the sequence of signals can also correspond to the address of the optical network unit ONU.

Figure 3:
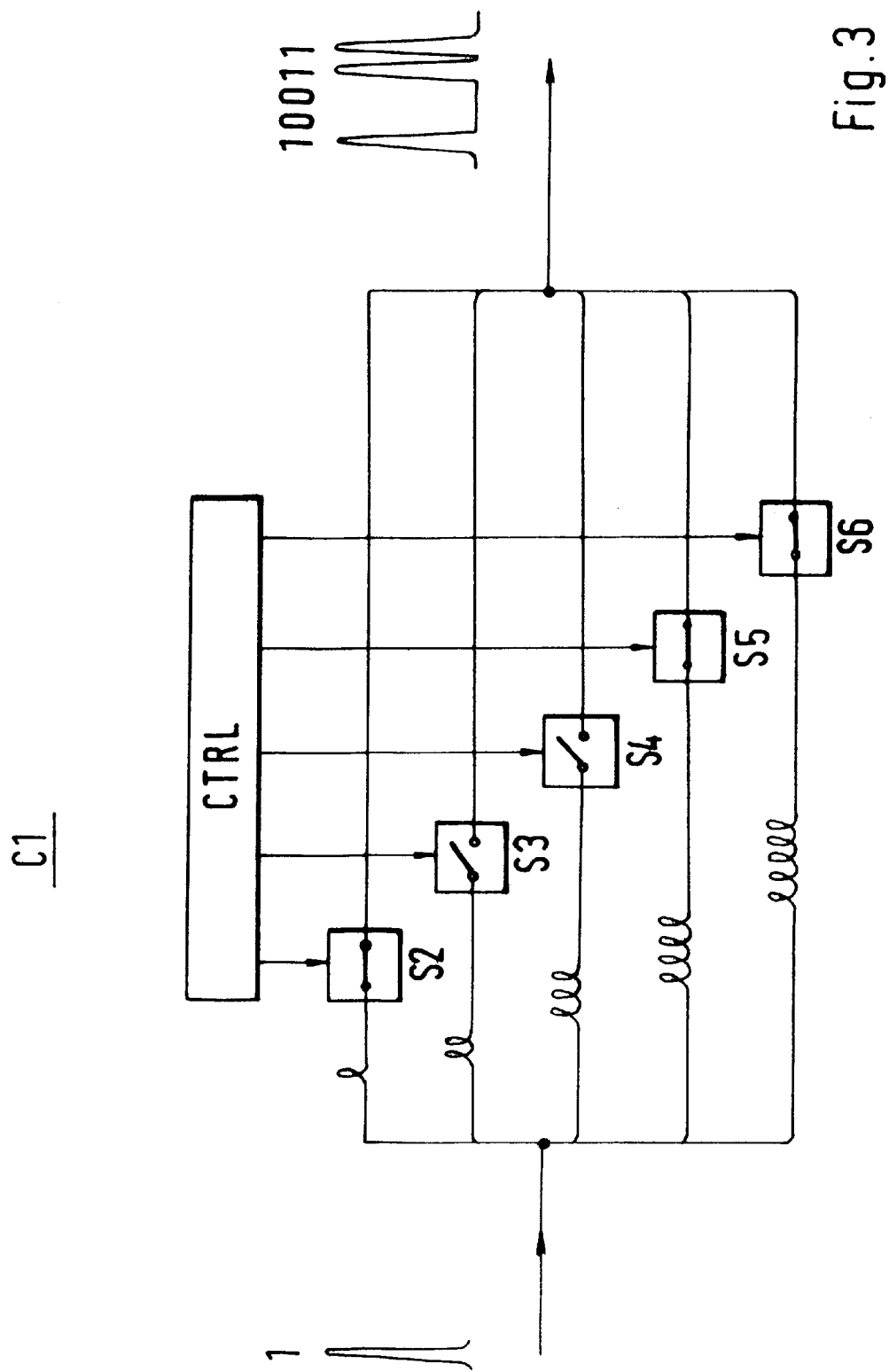
FIG. 3, schematically illustrates a construction of a CDMA encoder.

In conclusion, the embodiment will now be described with reference to FIG. 3. FIG. 3 shows a schematic design of the CDMA encoder of FIG. 1. The CDMA encoder C1 comprises two optical splitters, five electro/optical switches S2 to S6, and a controller CTRL.

The reference pulses modulated with the data stream are transmitted to the CDMA encoder C1 via an optical fiber link. The optical fiber link is split by the first optical splitter into five optical fiber links. Each of the five optical fiber links has a different length so that signals passing through these five optical fiber links have different time delays. The five optical fiber links are combined into a single optical fiber link with a second optical splitter. When a reference pulse passes through the first optical splitter, the five optical fiber links and the second optical splitter, a sequence of signals consisting of five optical pulses is detected at the output of the second optical splitter. In each of the five optical fiber links there is inserted an electro/optical switch S2 to S6. Each of the optical switches is controllable by the controller CTRL and capable of interrupting the respective optical fiber link so that a sequence of signals characteristic for each of the optical network units ONU is generated at the output of the second optical splitter. The signal string can represent the address of the optical network unit ONU, in the present example 10011, with 1=pulse, 0=no pulse. The electro/optical switches S2 to S6 can be set once when the system is initialized, or they can be set telemetrically or possibly dynamically by the center OLT. In the latter case, a connection is required between the processing unit UNIT1 which receives the actual parameter settings, and the CDMA encoder C1. With dynamic adjustment, the actual parameter settings are transmitted only when required. An example for a fixed setting: a center OLT is connected to 1000 optical network units ONU. 1000 CDMA decoders D1 to Dn are required in the center OLT. For 1000 different settings and CDMA encoding, 10-bit signal strings are required.

Example for dynamic adjustment: a center OLT is connected to 1000 optical network units ONU. Of those 1000 optical network units ONU, however, only 32 may be active at the same time, requiring only 5-bit signal strings. If an optical network unit ONU intends to transmit, it initially sends its 10-bit address to the center OLT and receives in response an actual unassigned 5-bit signal string for setting the electro/optical switches and for subsequently transmitting the information via the CDMA encoder C1. Consequently, for dynamic allocation there are required in the center OLT an optical/electrical converter for receiving the unfiltered signals and transmitting the addresses of the optical network units ONU to the arithmetic unit μP, and only 32 CDMA decoders D1 to Dn.

In the embodiment, the entire received composite signal consisting of reference pulses and data packet is transmitted to the electro/optical switch S1. In this case, the logical ones in the data stream have to be exactly matched to the period T of the reference pulses. In the present example, their time duration has to be less than T/2. Alternately, instead of the asymmetric coupler K1, a means for separately transmitting the received reference pulses and the received data packets can be used. This means is then used to transmit the reference pulses to the electro/optical switch S1 and the data packets to the processing unit UNIT1. This means can be implemented, for example, as an electro/optical switch. This is advantageous in that the logical one in the data stream generated by the processing unit can now have a time duration longer than T/2, but less than T.

In addition, an asymmetric coupler can be connected in front of the means for transmitting, for example, 20 percent of the received composite signal to a unit for the purpose of extracting the reference pulses from the received composite signal. The unit consists for example, of an optical/electrical converter and a phase-locked loop. The unit is used both for the extraction and for controlling the means with the extracted reference pulses. The extracted reference pulses can also be transmitted to the processing unit UNIT1, for example, for attaining synchronization.

In the embodiment, the reference pulses and the data packet are transmitted at the same wavelength. This approach is rather expensive if both signals are to be transmitted separately.

Instead of using one wavelength, the reference pulses and the data packets can also be transmitted at different wavelengths if optical fibers with a small dispersion are used; the reference pulses, for example, at 1300 nm and the data packet at 1550 nm. A means for separately transmitting these two signals can be realized by a passive, wavelength-dependent coupler.

In the embodiment, the optical composite signals are generated by the light source LAS and the electro/optical modulator MOD controlled by the electrical composite signals. Instead of the light source LAS and the electro/optical modulator MOD, however, a laser diode which can be controlled and modulated directly by the electrical composite signal of the control device μP, can also be used.

What is claimed is:

1. An optical network unit (ONU) of an optical communication network (NET) for receiving composite signals consisting of periodically transmitted reference pulses and data packets transmitted in the time intervals between the reference pulses, comprising a processing unit (UNIT1) for evaluating the received data packets and for generating a data stream,
    an electro-optical unit (S1) for modulating the received reference pulses with the generated data stream, and
    a CDMA encoder (C1) for encoding the modulated reference pulses using the asynchronous CDMA technique and for transmitting the encoded reference pulses.

2. An optical network unit (ONU) as claimed in claim 1, characterized in that the processing unit (UNIT1) comprises a unit for extracting the reference pulses from the received composite signal and a synchronizing unit for synchronizing the generated data stream with the extracted reference pulses.

3. An optical network unit (ONU) as claimed in claim 1, characterized in that the optical network unit (ONU) comprises a means for routing the received reference pulses and data packets onward separately, and that the reference pulses are routed to the electro-optical unit (S1) and the data packets to the processing unit.

4. An optical network unit (ONU) as claimed in claim 3, characterized in that the optical network unit (ONU) comprises a unit for extracting the reference pulses from the received composite signal, and that the means is controllable by the extracted reference pulses.

5. An optical network unit (ONU) as claimed in claim 3, characterized in that the means is an electro-optical switch.

6. An optical network unit (ONU) as claimed in claim 3, characterized in that the means is a wavelength-dependent passive coupler.

7. An optical network unit (ONU) as claimed in claim 1, characterized in that the parameters of the CDMA encoder (C1) are dynamically adjustable by the processing unit (UNIT1).

8. A center (OLT) of an optical communication network (NET) for transmitting composite signals consisting of reference pulses and data packets which are transmitted in the time intervals between the reference pulses, and for receiving a plurality of different CDMA-encoded signals, comprising a unit ($\mu$P, MOD, LAS) for generating the composite signals and a plurality of CDMA decoders (D1, D2, ..., Dn) for decoding the received encoded signals.

9. A center (OLT) as claimed in claim 8, characterized in that the unit ($\mu$P, MOD, LAS) comprises an arithmetic unit ($\mu$P) for generating electric composite signals, a light source (LAS), and an electro-optical modulator (MOD) for modulating the output signals of the light source with the electric composite signals.

10. A center (OLT) as claimed in claim 8, characterized in that the unit ($\mu$P, MOD, LAS) comprises an arithmetic unit ($\mu$P) for generating electric composite signals and a laser diode drivable directly by said electric composite signals.

11. A center (OLT) as claimed in claim 9, characterized in that the center (OLT) comprises an optical/electrical converter for receiving unfiltered signals and for routing addresses onward to the arithmetic unit.

* * * * *

UNITED STATES PATENT AND TRADEMARK OFFICE
CERTIFICATE OF CORRECTION

PATENT NO. : 6,011,637
DATED : January 4, 2000
INVENTOR(S) : Thomas Pfeiffer

It is certified that error appears in the above-identified patent and that said Letters Patent is hereby corrected as shown below:

On the cover of the patent, the following is missing:

--[30] Foreign Application Priority Data

May 23, 1996 [DE] Fed. Republic of Germany 196 20 723.1--.

Signed and Sealed this

Third Day of April, 2001

Attest:

NICHOLAS P. GODICI

Attesting Officer

Acting Director of the United States Patent and Trademark Office